(12) United States Patent
Higashitani et al.

(10) Patent No.: US 7,129,680 B2
(45) Date of Patent: Oct. 31, 2006

(54) VOLTAGE STEP-UP AND STEP-DOWN DC/DC CONVERTER

(75) Inventors: Hiroshi Higashitani, Osaka (JP); Takeo Yasuho, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 456 days.

(21) Appl. No.: 10/718,306

(22) Filed: Nov. 20, 2003

(65) Prior Publication Data

US 2004/0141341 A1    Jul. 22, 2004

(30) Foreign Application Priority Data

Nov. 20, 2002   (JP)   ............... 2002-336441

(51) Int. Cl.
*G05F 6/613*   (2006.01)

(52) U.S. Cl. ..................... 323/224; 323/285

(58) Field of Classification Search ........... 323/224, 323/283, 285
See application file for complete search history.

(56) References Cited

U.S. PATENT DOCUMENTS

| 6,166,527 A  * | 12/2000 | Dwelley et al. .......... 323/222 |
| 6,984,967 B1 * | 1/2006  | Notman .................... 323/282 |
| 2004/0085048 A1 * | 5/2004 | Tateishi .................... 323/224 |

FOREIGN PATENT DOCUMENTS

JP      07-322608 A     12/1995

\* cited by examiner

*Primary Examiner*—Shawn Riley
(74) *Attorney, Agent, or Firm*—RatnerPrestia

(57) ABSTRACT

DC/DC converter includes a voltage converting circuit connected between the input terminal and output terminal, a fast transient response circuit, a step-up and step-down operation determining circuit, a voltage comparator, and a switch control circuit.

27 Claims, 10 Drawing Sheets

FIG. 5A
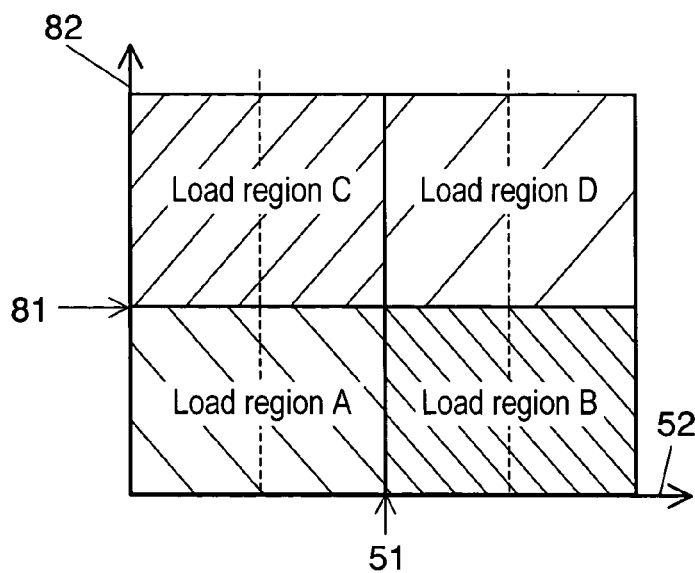
FIG. 5B
|  | First control operation determination signal 59 | Second control operation determination signal 62 |
|---|---|---|
| Load region A | Step-down operation | PFM operation |
| Load region B | Step-up operation | |
| Load region C | Step-down operation | PWM operation |
| Load region D | Step-up operation | |
FIG. 6
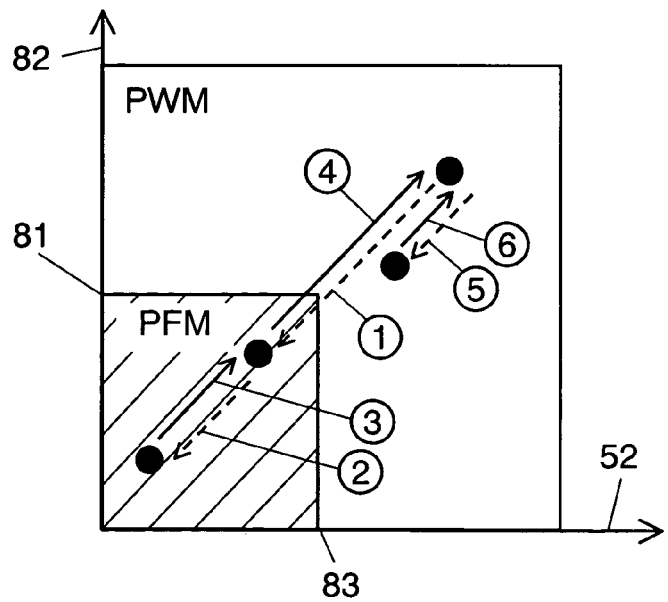

Control operation determination signal 2

|  | No output voltage change | With output voltage change |
|---|---|---|
| Light load (load region A, B) | PFM | PWM |
| Heavy load (load region C, D) | PWM | PWM |

VOLTAGE STEP-UP AND STEP-DOWN DC/DC CONVERTER

FIELD OF THE INVENTION

The present invention relates to a DC/DC converter for converting direct-current voltage used in various electronic appliances and communication devices.

BACKGROUND OF THE INVENTION

FIG. 11 is a block diagram of a conventional step-down type DC/DC converter used in a handy phone. As shown in FIG. 11, a series circuit of first switch circuit 100, inductor 102, and smoothing capacitor 104 is connected between input terminal 111 and output terminal 112. Output voltage 120 from the smoothing capacitor 104 and control voltage 121 from output voltage control terminal 113 are put into comparator 105. Output signal from this comparator 105 and output signal from oscillation circuit 106 are put into switch condition determining circuit 107. Output voltage 120 and switch current detection signal 122 from the first switch circuit 100 are put into control operation determining circuit 110, and the control operation determining circuit 110 judges the load, and feeds its output signal 123 into the oscillation circuit 106 and switch control circuit 108. The switch control circuit 108 receives the output of the switch condition determining circuit 107 and output signal 123 of the control operation determining circuit 110. Thus, the switch control circuit 108 supplies a signal for controlling the first switch circuit 100 to the first switch circuit 100. Feedback is composed in this manner.

Such prior art is disclosed, for example, in Japanese Laid-open Patent No. H7-322608.

In this conventional step-down type DC/DC converter, however, transient response time is long when lowering the voltage in step-down process of output voltage, and the output voltage cannot be lowered in a short time. As a result, power loss occurs during transient response time, and the battery voltage is decreased, and it is hard to extend the call time.

The conventional step-down DC/DC converter operates only in step-down process. That is, the conventional DC/DC converter cannot be used in step-up operation. Further, the conventional DC/DC converter is slow in response speed in transient response depending on the load situation, and wasteful power consumption occurs.

SUMMARY OF THE INVENTION

A DC/DC converter comprises:

a voltage converting circuit connected between an input terminal and an output terminal for outputting an output voltage and a switch current detection signal;

a fast transient response circuit for receiving the output voltage, control voltage, and switch current detection voltage, and outputting a second control operation determination signal;

a step-up and step-down operation determining circuit for receiving the output voltage, the control voltage, and input voltage, and outputting a first control operation determination signal;

a voltage comparator for receiving the output voltage, the control voltage, and the second control operation determination signal, and outputting a switch condition signal; and a switch control circuit for receiving the switch condition signal, the first control operation determination signal, and the second control operation determination signal, and outputting a switch control signal, wherein the switch control signal is fed into the voltage converting circuit, and a feedback circuit is composed.

BRIEF DESCRIPTION OF THE DRAWINGS

FIG. 5A is an explanatory diagram of load region of DC/DC converter of the invention.

FIG. 5B is a diagram showing an operation condition table determined by first control operation determination signal and second control operation determination signal in DC/DC converter of the invention.

FIG. 6 is an operation transition diagram of DC/DC converter of the invention.

DETAILED DESCRIPTION OF THE EXEMPLARY EMBODIMENTS

Figure 1:
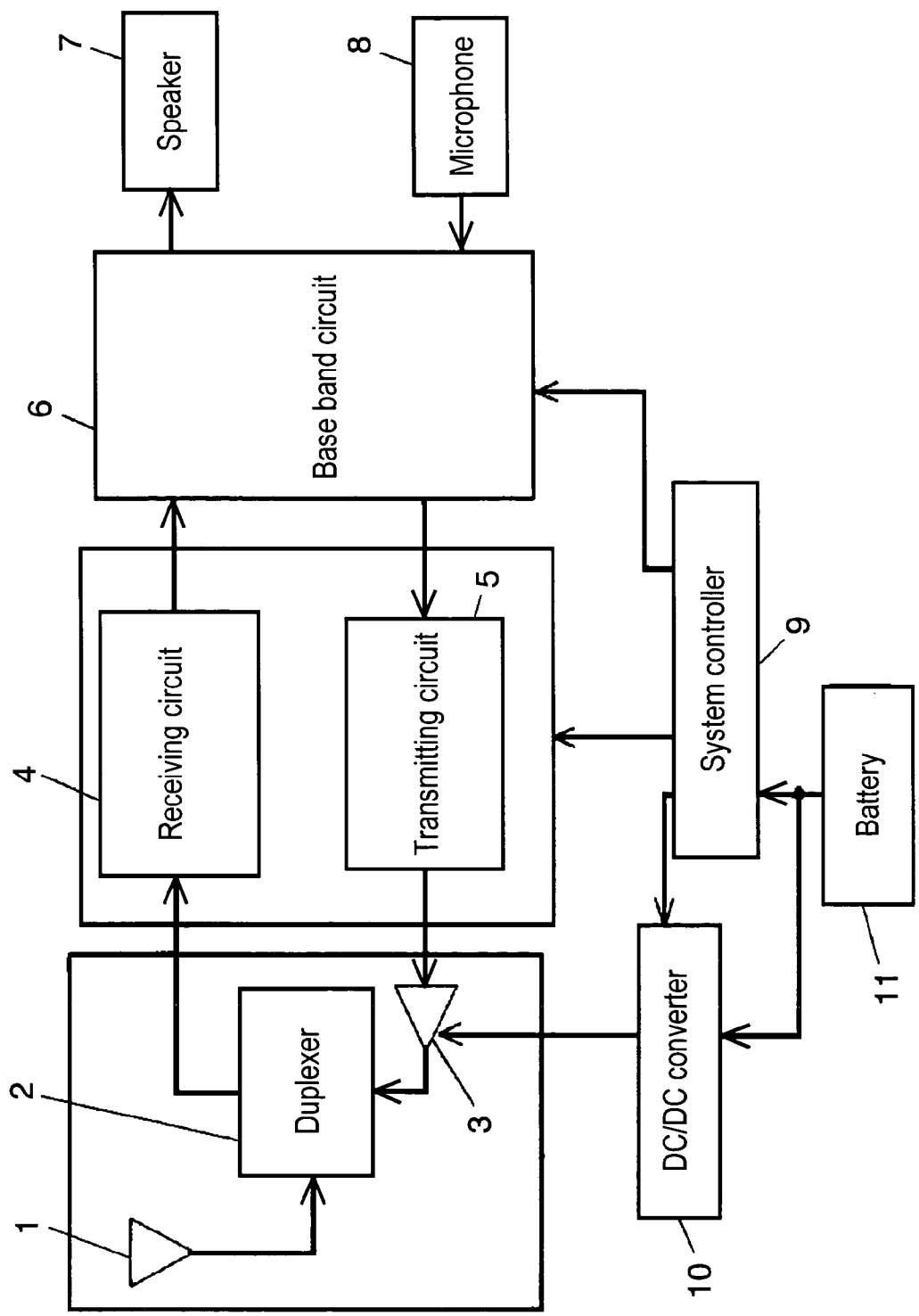
FIG. 1 is a circuit block diagram of handy phone.

The invention presents a DC/DC converter of step-up and step-down compatible type having solved the problems of the prior art discussed above.

Referring now to the drawings, an exemplary embodiment of the invention is described below.

FIG. 1 is a circuit block diagram of handy phone. A radio frequency signal received by an antenna 1 is supplied into a receiving circuit 4 by way of a duplexer 2. The receiving circuit 4 processes the entered radio frequency signal as specified, and sends a base band signal to a base band circuit 6. The base band circuit 6 processes the entered base band signal as specified, and sends an audio signal to a speaker 7. Then voice signal is delivered from the speaker 7. On the other hand, voice to be transmitted is converted into an audio signal by a microphone 8, and is sent into the base band circuit 6. The base band circuit 6 processes the entered audio signal as specified, and supplied into a transmitting circuit 5. The transmitting circuit 5 processes the output from the base band circuit 6 as specified, and supplies a radio frequency signal to a transmission power amplifier 3. The transmission power amplifier 3 amplifies the entered radio frequency signal, and transmits from the antenna 1 by way of the duplexer 2.

At this time, voltage is supplied from a battery 11 to a system controller 9 and a DC/DC converter 10. The DC/DC converter 10 converts the voltage supplied from the battery 11, and supplies the converted voltage to the transmission power amplifier 3, so that stable transmission is assured. The voltage supplied from the battery 11 is converted by the system controller 9, and the converted voltage is supplied to the receiving circuit 4, transmitting circuit 5, and base band circuit 6.

Figure 2:
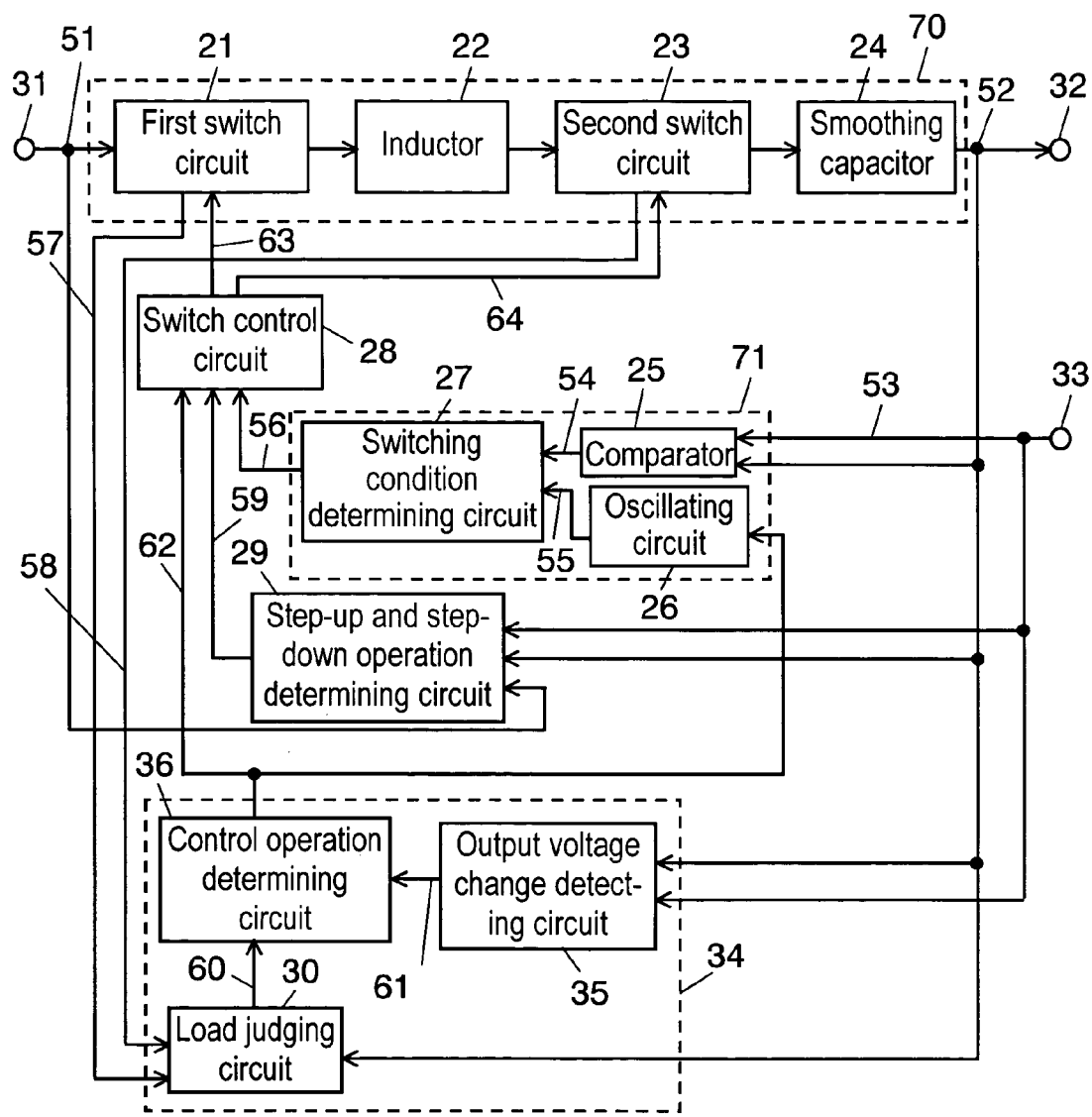
FIG. 2 is a circuit block diagram of DC/DC converter of the invention.

FIG. 2 is a detailed circuit diagram of the DC/DC converter 10.

A voltage converting circuit 70 is connected between an input terminal 31 and an output terminal 32. This voltage converting circuit 70 is composed of series connection of a first switch circuit 21, an inductor 22, a second switch circuit 23, and a smoothing capacitor 24. The voltage converting circuit 70 converts the input voltage 51 from the input terminal 31 into a specified direct-current voltage, and sends out the converted output voltage 52 from the output terminal 32.

A fast transient response circuit 34 is composed of an output voltage change detecting circuit 35, a load judging circuit 30, and a control operation determining circuit 36. The output voltage 52 and control voltage 53 are put into the output voltage change detecting circuit 35, and the output voltage change detecting circuit 35 feeds an output voltage change detection signal 61 into the control operation determining circuit 36.

The output voltage 52, a first switch current detection signal 57 from the first switch circuit 21 composing the voltage converting circuit 70, and a second switch current detection signal 58 from the second switch circuit 23 are supplied into the load judging circuit 30, and the load judging circuit 30 feeds a load region detection signal 60 into the control operation determining circuit 36. Herein, the first switch current detection signal 57 and second switch current detection signal 58 are collectively called the switch current detection signal.

The control operation determining circuit 36 outputs a second control operation determination signal 62 on the bases of the load region detection signal 60 and output voltage change detection signal 61 for determining PWM (pulse width modulation) operation or PFM (pulse frequency modulation) operation.

This second control operation determination signal 62 is fed into the oscillating circuit 26 which is constituent members of a voltage comparator 71 and fed into switch control circuit.

A step-up and step-down operation determining circuit 29 receives the output voltage 52, control voltage 53, and input voltage 51, and outputs a first control operation decision signal 59 determining either step-up operation or step-down operation.

The voltage comparator 71 is composed of comparator 25, oscillating circuit 26, and switching condition determining circuit 27. The comparator 25 receives the output voltage 52 and control voltage 53, and feeds an error voltage 54 of difference of the two into the switching condition determining circuit 27. The oscillating circuit 26 receives a second control operation determination signal 62, and feeds a reference triangular wave signal 55 into the switching condition determining circuit 27. The switching condition determining circuit 27 outputs a switching condition signal 56 on the basis of the error voltage 54 and reference triangular wave signal 55.

The step-up and step-down operation determining circuit 29 outputs a first control operation determination signal 59 determining either step-up operation or step-down operation, and the fast transient response circuit 34 outputs a second control operation determination signal 62 for determining either PWM operation or PFM operation. The voltage comparator 71 outputs a switch condition signal 56. This switch condition signal 56 is a signal for determining the on/off time (time ratio or duty) of the switches of the first switch circuit 21 and second switch circuit 23 in the case of PWM operation, or a signal for determining the frequency of the switch in the case of PFM operation. The switch control circuit 56 is fed into the switch control circuit 28. The switch control circuit 28 feeds the first switch control signal 63 to the first switch circuit 21 and the second switch control signal 64 to the second switch circuit 23. Herein, the first switch control signal 63 and second switch control signal 64 are collectively called the switch control signal.

As described herein, the DC/DC converter of the invention is a step-up/down type DC/DC converter for controlling the voltage of the DC/DC converter by feedback, converting the direct-current voltage depending on the control voltage 53 supplied from the control voltage input terminal 33, and outputting a converted output voltage 52 from the output terminal 32.

Figure 3A:
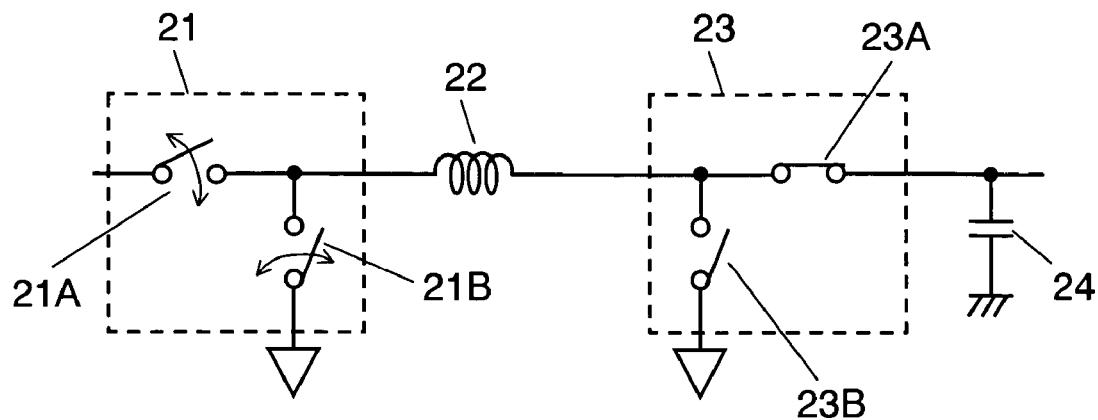
FIG. 3A is a diagram showing step-down operation of DC/DC converter of the invention.
Figure 3B:
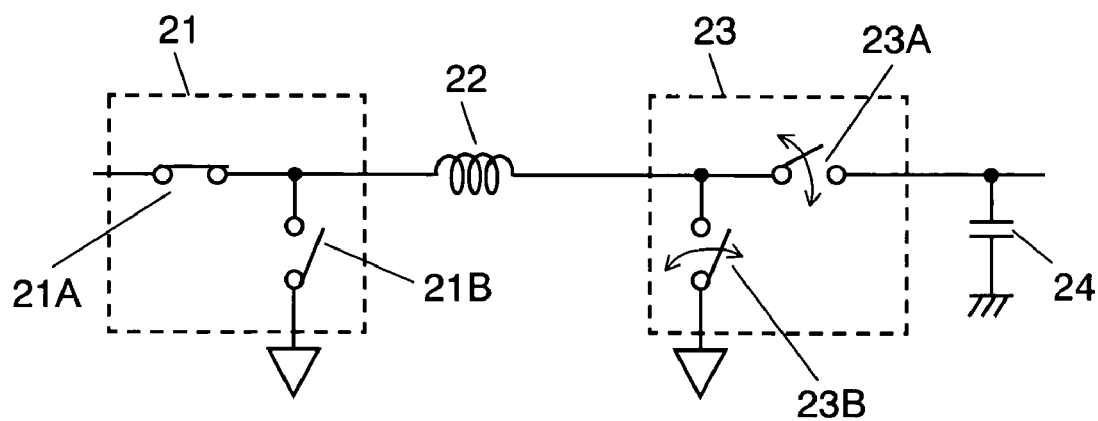
FIG. 3B is a diagram showing step-up operation of DC/DC converter of the invention.

FIG. 3A and FIG. 3B show structural examples of the voltage converting circuit 70, and the step-down operation principle and step-up operation principle are explained below by referring to FIG. 3A and FIG. 3B.

The step-down operation is explained in the circuit diagram of FIG. 3A. The on/off time durations of the switches 21A and 21B composing the first switch circuit 21 are controlled on the basis of the first switch control signal 63 of the switch control circuit 28. The switches 23A and 23B composing the second switch circuit 23 are controlled on the basis of the second switch control signal 64. The second switch circuit 23 sets the switch 23A connected in series between the input and output in normally ON state, and sets the other switch 23B in normally OFF state, so that charging or discharging of electric power is repeated together with the inductor 22, and the voltage is converted.

The step-up operation is explained in the circuit diagram of FIG. 3B.

The on/off time durations of the switches 23A and 23B composing the second switch circuit 23 are controlled on the basis of the second switch control signal 64 of the switch control circuit 28. The two switches composing the first switch circuit 21 are controlled on the basis of the first switch control signal 63. The first switch circuit 21 sets the switch 21A connected in series between the input and output in normally ON state, and sets the other switch 21B in normally OFF state, so that charging or discharging of electric power is repeated together with the inductor 22, and the voltage is converted.

After voltage conversion in this manner, the voltage is smoothed by the smoothing capacitor 24, and an output voltage 52 is output from the output terminal 32.

Figure 4A:
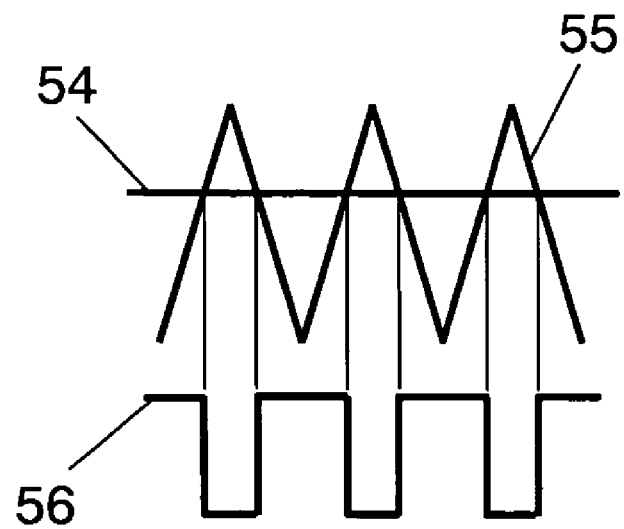
FIG. 4A is a diagram showing switch condition signal in PWM operation of DC/DC converter of the invention.
Figure 4B:
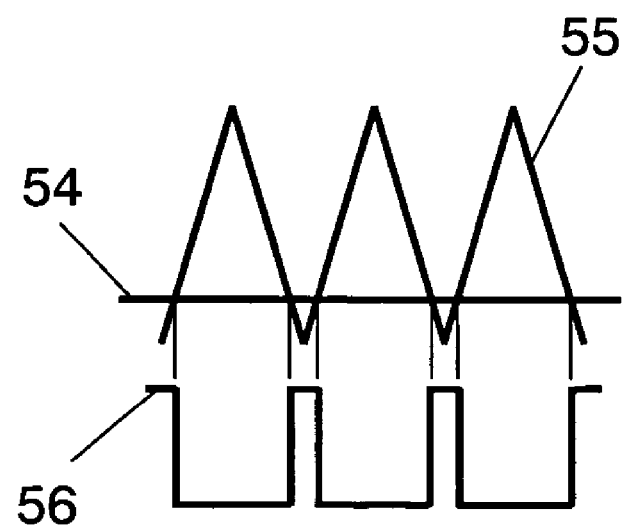
FIG. 4B is a diagram showing switch condition signal in other case of PWM operation of DC/DC converter of the invention.

FIG. 4A and FIG. 4B show the relation of error voltage 54, reference triangular wave signal 55, and switch condition signal 56 in PWM (pulse width modulation) operation in the voltage comparator 71. Referring to FIG. 4A and FIG. 4B, this is to show the generating procedure of switch condition signal 56 for controlling the first switch circuit 21 and second switch circuit 23 in the switch control circuit 28.

In PWM operation, the error voltage 54 is compared with the reference triangular wave signal 55 of specific frequency output from the oscillating circuit 26, and a switch condition signal 56 corresponding to the result of comparison is output from the switching condition determining circuit 27.

As shown in FIG. 4A, when the error voltage 54 is high, a switch condition signal 56 of high time ratio (duty) of ON period is output to the switch control circuit 28. Accordingly, the feedback loop functions in a direction of raising the output voltage 52.

As shown in FIG. 4B, when the error voltage 54 is low, a switch condition signal 56 of low time ratio (duty) of ON period is output to the switch control circuit 28. Accordingly, the feedback loop functions in a direction of lowering the output voltage 52.

FIG. 5A and FIG. 5B show the relation of step-up operation and step-down operation by a first control operation determination signal 59 in each region, and PWM operation and PFM operation by a second control operation determination signal 62.

In FIG. 5A, the axis of abscissas denotes the output voltage 52, and the axis of ordinates represents an output current 82 of DC/DC converter. By the output voltage 52 and output current 82, the load region is divided into four sections. They are load region A, load region B, load region C, and load region D. The load region A is a region in which the output voltage 52 is not greater than input voltage 51, and the output current 82 is not greater than threshold current 81. The load region B is a region in which the output voltage 52 is larger than input voltage 51, and the output current 82 is not greater than threshold current 81. The load region C is a region in which the output voltage 52 is not greater than input voltage 51, and the output current 82 is larger than threshold current 81. The load region D is a region in which the output voltage 52 is larger than input voltage 51, and the output current 82 is larger than threshold current 81.

FIG. 5B shows the relation of the four load regions defined in FIG. 5A and the first control operation determination signal 59 and second control operation determination signal 62.

As shown in FIG. 5A and FIG. 5B, when the output voltage 52 is higher than the input voltage 51, the step-up operation functions, and when the output voltage 52 is lower than the input voltage 51, the step-down operation functions. Whether the step-up operation or step-down operation is determined by the relation of the input voltage and output voltage.

Further, the threshold current 81 is set for the output current 82, and when the output current 82 is larger than the threshold current 81, the PWM operation functions, and when the output current 82 is smaller than the threshold current 81, the PFM operation functions. Whether the PWM operation or PFM operation is determined by the relation of the output current 82 and threshold current 81.

FIG. 6 shows other operation of the DC/DC converter. In FIG. 6, the axis of abscissas denotes the output voltage 52 and the axis of ordinates represents the output current 82. FIG. 6 classifies into PWM operation region and PFM operation region by the specified threshold voltage 83 and threshold current 81. The region in which the output voltage 52 is lower than the threshold voltage 83 and the output current is smaller than the threshold current 81 is the region of PFM. Other region is the region of PWM. Bullet mark indicates each operation point, and status transitions ① to ⑥ are considered at each operation point.

Figure 7:
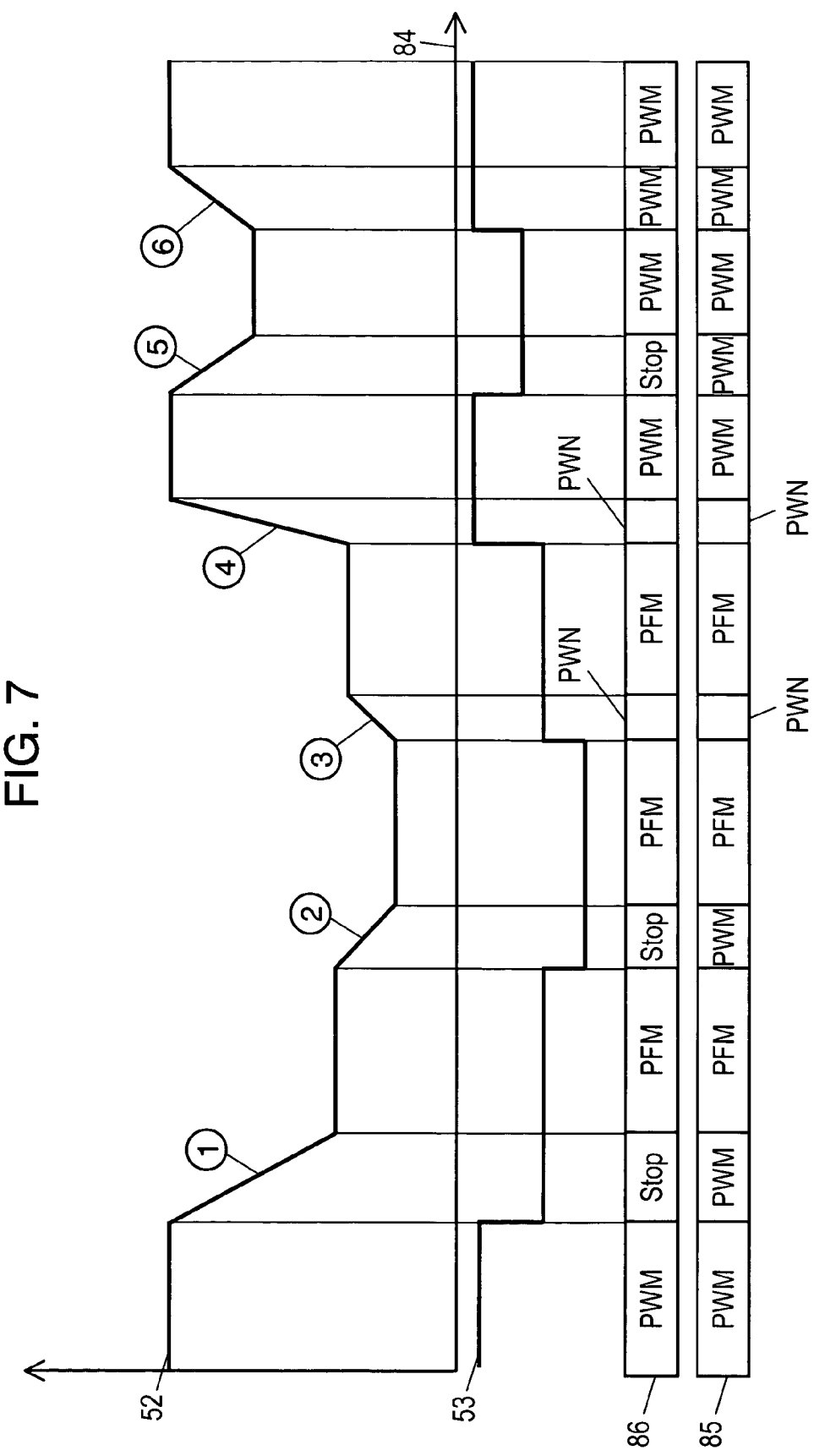
FIG. 7 is a timing chart of operation mode of DC/DC converter of the invention.

FIG. 7 is a timing chart corresponding to the transition of operation modes in FIG. 6. FIG. 7 shows transition of the output voltage 52 in relation to the time 84 plotted on the axis of abscissas, transition of the control voltage 53, and transition 85 of the circuit operation of the invention. At the same time, the transition 86 of the operation in the conventional circuit is shown. These indicate the output voltage 52 and operation mode in stationary state or variable state (status transition) of the output voltage 52 corresponding to the control voltage 53 entered from the control voltage input terminal 33. By the input of the control voltage 53, the output voltage 52 is controlled. At this time, depending on the relation of the control voltage 53 and output voltage 52, and the situation of status transition, the mode is changed as in operation 85 of the circuit of the invention. For example, in status transition ①, status transition ② and status transition ⑤, the operation 85 of the circuit of the invention executes the PWM operation.

On the other hand, when the output voltage 52 steps down as shown in status transition ①, status transition ② and status transition ⑤ in FIG. 6 and FIG. 7, the conventional circuit operation 86 is stopped.

Figure 8:
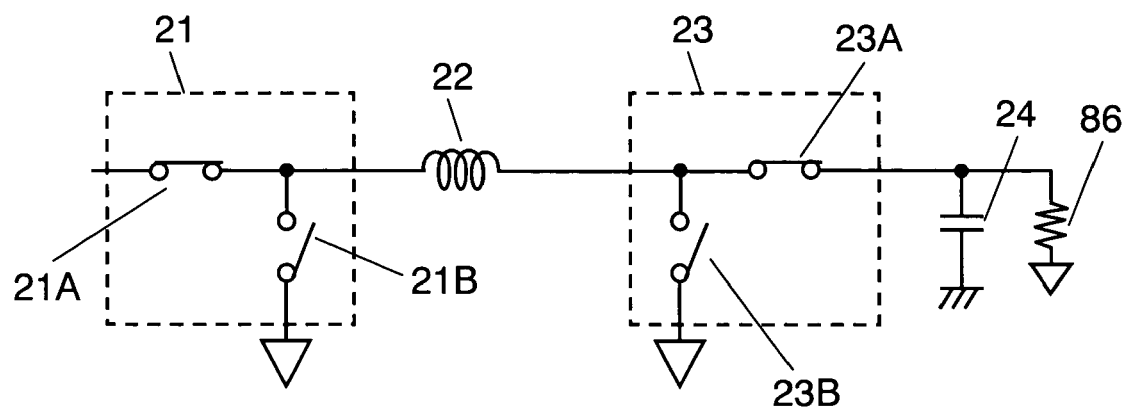
FIG. 8 is a block diagram of part of voltage converting circuit in the invention, showing an operation equivalent to operation in conventional voltage converting circuit executed in the voltage converting circuit of the invention.

FIG. 8 shows execution of operation equivalent to the conventional circuit operation 86 shown in FIG. 7 by the voltage converting circuit 70 of the invention shown in FIG. 3A and FIG. 3B. Operation in the conventional circuit operation 86 functions so that one switch 21A composing the first switch circuit 21 and one switch 23A for composing the second switch 23 may always connect the input terminal 31 and output terminal 32, and the switch 21B and switch 23B connected to the ground are equivalent to normally OFF operation state.

Accordingly, in the conventional circuit operation 86, the transient response time of the output voltage is determined by the time constant of the smoothing capacitor 24 and load resistance 86. In particular, the load resistance is large when changing to light load, and a long transient response time is required.

The circuit of the invention functions in the PWM operation also in the condition of status transition ①, status transition ② and status transition ⑤ as shown in FIG. 7, and hence fast transient response is realized.

Figure 9:
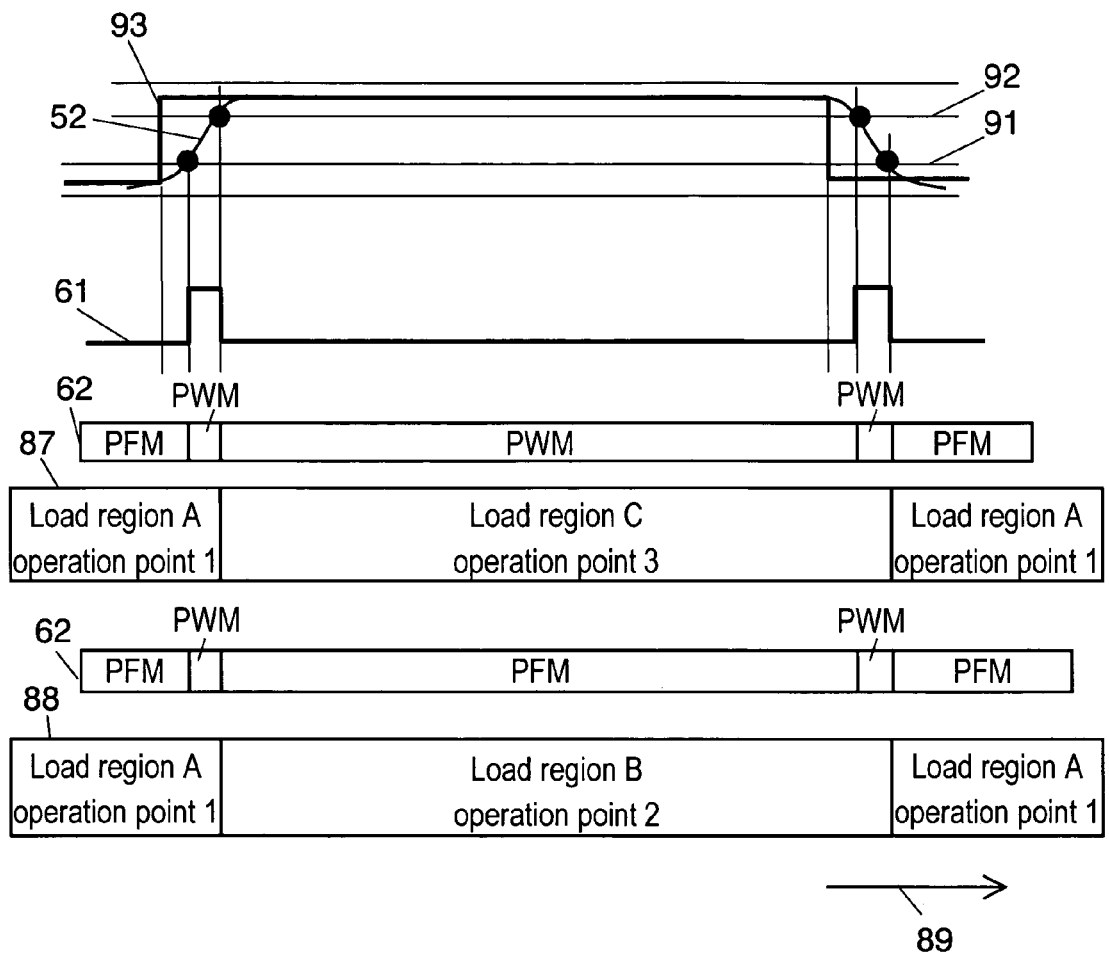
FIG. 9 is an operation principle diagram of transient response of DC/DC converter of the invention.

FIG. 9 shows the principle of operation of the fast transient response circuit 34.

FIG. 9 shows, in change patterns of two load regions, a target output voltage 93 corresponding to the control voltage 53, output voltage 52, output voltage change detection signal 61 output from output voltage change detection circuit 35, second control operation determination signal 62 output from the fast transient response circuit 34, and the PWM and PFM operation conditions determined by the second control operation determination signal 62. These two load changes are load change 87 and load change 88. The load change 87 is a load change from load region A through load region C and back to load region A. On the other hand, the load change 88 is a load change from load region A through load region B and back to load region A. That is, the load change 87 is a load change passing a heavy load state surpassing the threshold current 81 shown in FIG. 5, and the load change 88 is a load change passing a light load state not surpassing the threshold current 81 shown in FIG. 5. The target output voltage 93, output voltage 52, output voltage change detection signal 61, and second control operation determination signal 62 are expressed on the axis of abscissas 89 in terms of the time.

As explained above, the output voltage 52 and control voltage 53 are entered in the output voltage change detecting circuit 35. The output voltage change detecting circuit 35 detects that the output voltage 52 is changed when the output voltage 52 is changed more than a specified value. That is, in the process of transition from load region A to load region C (or load region B), a voltage higher by the specified value than the output voltage 52 in stationary state in load region A is set as a first threshold voltage 91. In the process of transition from load region C (or load region B) to load region A, a voltage lower by the specified value than the output voltage 52 in stationary state in load region C (or load region B) is set as a second threshold voltage 92. In the process of transition from load region A to load region C (or load region B), the output voltage change detecting circuit 35 changes the output voltage change detection signal 61 to high level at the timing of the output voltage 52 surpassing the first threshold voltage 91, and changes the output voltage change detection signal 61 to low level at the timing of the output voltage 52 surpassing the second threshold voltage 92. In the process of transition from load region C (or load region B) to load region A, the output voltage change detecting circuit 35 changes the output voltage change detection signal 61 to high level at the timing of the output voltage 52 becoming lower than the second threshold voltage 91, and changes the output voltage change detection signal 61 to low level at the timing of the output voltage 52 becoming lower than the first threshold voltage 92. In this way, the output voltage change detecting circuit 35 generates the output voltage change detection signal 61.

In the control operation determining circuit 36, this output voltage change detection signal 61 and load region detection signal 60 from the load judging circuit 30 are entered. That is, the control operation determining circuit 36 generates a second control operation determination signal 61 on the basis of the load region detection signal 60 and output voltage detection signal 61 corresponding to the load change 87 or load change 88.

When the output voltage change detecting circuit 35 detects that the output voltage 52 is changed by a voltage difference more than the specified value from the target output voltage 93 corresponding to the control voltage 53, this DC/DC converter operates to execute the PWM operation regardless of the output current or output voltage 52. On the other hand, when change of output voltage 52 is not detected, that is, the output voltage 52 does not have voltage difference of more than the specified value from the target output voltage 93 corresponding to the control voltage 53, this DC/DC converter operates to execute the operation mode determined by the load region detection signal 60 generated by the load judging circuit 30, out of the two operation modes.

In the case of load change 88, for example, the load change occurs in the sequence of load region A, load region B, and load region A shown in FIG. 5.

In load region A and load region B shown in FIG. 5, the DC/DC converter of the invention functions in PFM operation in stationary state. However, in the output voltage change detection period when the load condition changes, the PWM operation functions in both of light load and heavy load defined by comparison with the threshold current.

The fast transient response circuit 34 may also have an output fluctuation suppression function for suppressing the fluctuation of the output voltage 52 when the change of the output voltage 52 is changed from undetected state to detected state or from detected state to undetected state in the output voltage change detecting circuit 35.

Meanwhile, in the block diagram of the DC/DC converter circuit of the invention shown in FIG. 2, the voltage converting circuit 70 is composed of series connection of first switch circuit 21, inductor 22, second switch circuit 23, and smoothing capacitor 24. In such configuration, since the first switch circuit 21 and second switch circuit 23 are in series relation, the insertion loss of the first switch circuit 21 and insertion loss of the second switch circuit 23 are summed up.

Therefore, these insertion losses may cause problems. To solve such problems of insertion loss, a circuit block diagram of DC/DC converter of the invention is shown in FIG. 10.

Figure 10:
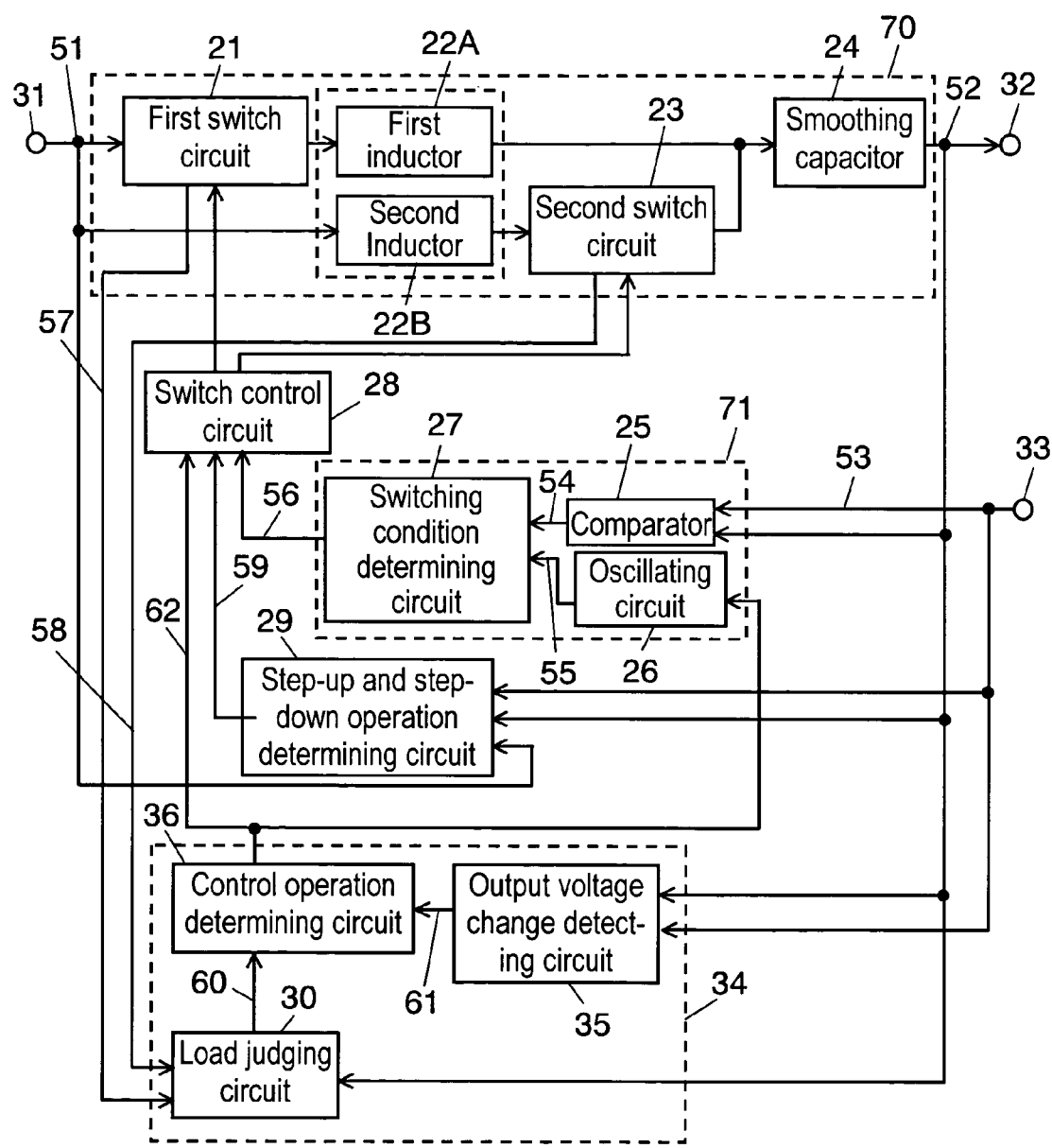
FIG. 10 is other circuit block diagram of DC/DC converter of the invention.
Figure 11:
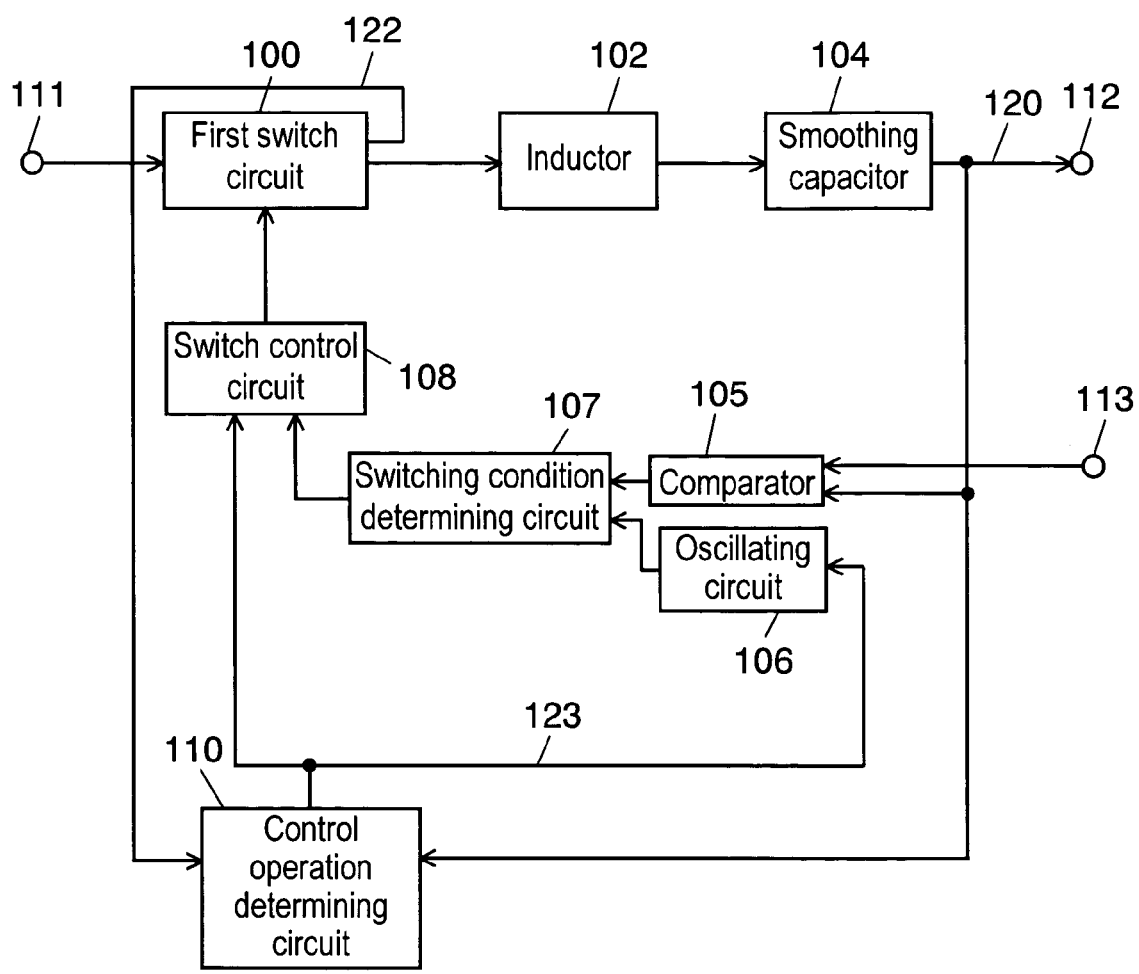
FIG. 11 is a block diagram of conventional DC/DC converter.

In FIG. 10, same parts as in FIG. 2 are identified with same reference numerals, and their detailed description is omitted. What differs from FIG. 2 is the configuration of the voltage converting circuit 70, and it is mainly explained. The voltage converting circuit 70 is composed of first switch circuit 21, first inductor 22A, second inductor 22B, second switch circuit 23, and smoothing capacitor 24. The first switch circuit 21 and first inductor 22A are connected in cascade, and a first cascade connection circuit is composed. The second inductor 22B and second switch circuit 23 are connected in cascade, and a second cascade connection circuit is composed. The first cascade connection circuit and second cascade connection circuit are connected in parallel. Input voltage 51 is supplied into the first switch circuit 21 and second inductor 22B. The first switch circuit 21 operates same as in FIG. 2, and is controlled by the switch control circuit 28. The second switch circuit 23 also operates same as in FIG. 2, and is controlled by the switch control circuit 28. The output of the first inductor 22A and output of the second switch 23 are combined, and are put into the smoothing capacitor 24. The smoothing capacitor 24 operates same as the smoothing capacitor 24 in FIG. 2, and outputs an output voltage 52. Other parts of the voltage converting circuit 70 operate same as explained on the basis of the configuration in FIG. 2.

In the configuration in FIG. 10, the insertion loss of the first switch circuit 21 and insertion loss of the second switch circuit 23 are not summed up. Therefore, there is no problem of insertion loss as discussed above.

Meanwhile, there is one inductor 22 in the configuration of FIG. 2, but two inductors are needed in the configuration in FIG. 10 (first inductor 22A and second inductor 22B). However, the first inductor 22A and second inductor 22B may be formed integrally by laminating and patterning by plating. As a result, the number of parts is reduced, the mounting area and mounting cost can be saved. Therefore, there is no problem if two inductors are needed.

The operation and effect of the configuration in FIG. 2 are explained in FIG. 3A to FIG. 9. In the configuration of the DC/DC converter of the invention shown in FIG. 10, same operation and effect are obtained.

Thus, in the DC/DC converter of the invention, at the time of output voltage drop, the output voltage can be lowered in a short time, and power loss in transient response can be decreased. When the DC/DC converter of the invention is applied in handy phone or the like, the call time can be extended.

Also in the DC/DC converter of the invention, at the time of output voltage rise, the output voltage can be raised in a short time, and power loss can be decreased substantially.

Recently, as the battery voltage is lowered, it may be required to operate at the setting of battery voltage lower than the voltage of the power source for power amplifier. The DC/DC converter of the invention is capable of executing both step-down operation and step-up operation efficiently. That is, the DC/DC converter of the invention is applicable to low voltage of the battery voltage.

The voltage control circuit of the invention also includes a step-up and step-down determining circuit for determining whether to step up or step down the voltage, and a fast transient response circuit for determining the operation mode of the voltage converting circuit. As a result, applicable to both step-up and step-down operation, fast transient response of output voltage is possible at the time of output voltage change regardless of the battery voltage. Still more, when the DC/DC converter of the invention is applied in the handy phone or the like, the call time can be extended.

In the invention, in step-down operation or step-up operation, the first switch circuit or second switch circuit can be operated individually. Therefore, the ON resistance of the switch can be decreased, and the efficiency can be enhanced.

Also in the invention, the load condition is divided, and the optimum operating condition is set, so that the efficiency can be enhanced.

Further, the invention can eliminate sudden fall or rise of voltage at the time of output voltage change. Therefore, by using the DC/DC converter of the invention in the handy phone or the like, a stable transmission situation can be assured.

What is claimed is:

1. A DC/DC converter comprising:
    a voltage converting circuit connected between an input terminal and an output terminal for outputting an output voltage and a switch current detection signal;
    a fast transient response circuit for receiving the output voltage, control voltage, and switch current detection voltage, and outputting a second control operation determination signal;
    a step-up and step-down operation determining circuit for receiving the output voltage, the control voltage, and input voltage, and outputting a first control operation determination signal;
    a voltage comparator for receiving the output voltage, the control voltage, and the second control operation determination signal, and outputting a switch condition signal; and
    a switch control circuit for receiving the switch condition signal, the first control operation determination signal, and the second control operation determination signal, and outputting a switch control signal,
    wherein the voltage converting circuit is composed of series connection of:
    a first switch circuit;
    an inductor;
    a second switch circuit; and
    a smoothing capacitor;
    wherein the fast transient response circuit comprises:
        a load judging circuit for receiving the switch current detection signal output from at least one of the first switch circuit and the second switch circuit, and the output voltage output from the smoothing capacitor, detecting an output load region, and outputting a load region detection signal;
        an output voltage change detecting circuit for comparing the control voltage and the output voltage, detecting the change of the output voltage and outputting an output voltage change detection signal; and
        a control operation determining circuit for outputting the second control operation determination signal for determining a control mode of the switch control circuit by the load region detection signal and the output voltage change signal to the switch control circuit and the voltage comparator; and
    wherein the switch control signal is fed into the voltage converting circuit, and a feedback circuit is composed.

2. The DC/DC converter of claim 1,
    wherein the first switch circuit operates to connect the input terminal and inductor all the time when the voltage converting circuit is in step-up operation.

3. The DC/DC converter of claim 1,
    wherein the second switch circuit operates to connect the inductor and the smoothing capacitor all the time when the voltage converting circuit is in step-down operation.

4. The DC/DC converter of claim 1,
    wherein the voltage comparator comprises:
        a comparator for receiving the output voltage and the control voltage, comparing, and outputting an error voltage;
        an oscillating circuit for outputting a reference triangular wave signal based on the second control operation determination signal; and
        a switching condition determining circuit for comparing the error voltage and the reference triangular wave signal, and outputting the switch condition signal.

5. The DC/DC converter of claim 1,
    wherein the second control operation determining signal is a signal for determining the operation mode of either PWM or PFM.

6. The DC/DC converter of claim 4,
    wherein the oscillating circuit changes an oscillation frequency depending on the second control operation determination signal, and also executes to operate to change the switch frequency or time ratio of the switching condition determining circuit.

7. The DC/DC converter of claim 1,
    wherein the voltage converting circuit comprises:
        a first cascade connection circuit composed of first switch circuit and first inductor;
        a second cascade connection circuit composed of second switch circuit and second inductor; and
        a smoothing capacitor,
        wherein the first cascade connection circuit and the second cascade connection circuit are connected in parallel, and
        wherein the output of the first cascade connection circuit and output of the second cascade connection circuit are put into the smoothing capacitor.

8. The DC/DC converter of claim 1, wherein the operation functions by selecting either one of two operation modes defined by the value of the threshold current of the whole load region set by the load current value and the output voltage value.

9. The DC/DC converter of claim 1, wherein the operation functions by selecting either one of two operation modes defined by the value of one or two or more threshold currents of the whole load region set by the load current value and the output voltage value.

10. The DC/DC converter of claim 1 wherein the PWM control is operated regardless of the output current and the output voltage in the condition of detection of change of the output voltage having a voltage difference more than a specified value in the output voltage as compared with the target output voltage corresponding to the control voltage in the output voltage change detecting circuit, and
    the operation mode determined by the load region detection signal out of the two operation modes is executed in the condition not having the voltage difference more than the specified value and not detecting the change of the output voltage.

11. The DC/DC converter of claim 1, wherein the fast transient response circuit has an output fluctuation suppressing function for suppressing the fluctuation of the output voltage when the change of the output voltage in the output voltage change circuit is changed from undetected state to detected state or from detected state to undetected state.

12. The DC/DC converter of claim 1, wherein the operation functions by selecting either one of two operation modes defined by the value of the threshold current of the whole load region set by the load current value and the output voltage value.

13. The DC/DC converter of claim 2, wherein the operation functions by selecting either one of two operation modes defined by the value of the threshold current of the whole load region set by the load current value and the output voltage value.

14. The DC/DC converter of claim 3, wherein the operation functions by selecting either one of two operation modes defined by the value of the threshold current of the whole load region set by the load current value and the output voltage value.

15. The DC/DC converter of claim 1, wherein the operation functions by selecting either one of two operation modes defined by the value of the threshold current of the whole load region set by the load current value and the output voltage value.

16. The DC/DC converter of claim 4, wherein the operation functions by selecting either one of two operation modes defined by the value of the threshold current of the whole load region set by the load current value and the output voltage value.

17. The DC/DC converter of claim 5, wherein the operation functions by selecting either one of two operation modes defined by the value of the threshold current of the whole load region set by the load current value and the output voltage value.

18. The DC/DC converter of claim 6, wherein the operation functions by selecting either one of two operation modes defined by the value of the threshold current of the whole load region set by the load current value and the output voltage value.

19. The DC/DC converter of claim 7, wherein the operation functions by selecting either one of two operation modes defined by the value of the threshold current of the whole load region set by the load current value and the output voltage value.

20. The DC/DC converter of claim 1, wherein the operation functions by selecting either one of two operation modes defined by the value of one or two or more threshold currents of the whole load region set by the load current value and the output voltage value.

21. The DC/DC converter of claim 2, wherein the operation functions by selecting either one of two operation modes defined by the value of one or two or more threshold currents of the whole load region set by the load current value and the output voltage value.

22. The DC/DC converter of claim 3, wherein the operation functions by selecting either one of two operation modes defined by the value of one or two or more threshold currents of the whole load region set by the load current value and the output voltage value.

23. The DC/DC converter of claim 1, wherein the operation functions by selecting either one of two operation modes defined by the value of one or two or more threshold currents of the whole load region set by the load current value and the output voltage value.

24. The DC/DC converter of claim 4, wherein the operation functions by selecting either one of two operation modes defined by the value of one or two or more threshold currents of the whole load region set by the load current value and the output voltage value.

25. The DC/DC converter of claim 5, wherein the operation functions by selecting either one of two operation modes defined by the value of one or two or more threshold currents of the whole load region set by the load current value and the output voltage value.

26. The DC/DC converter of claim 6, wherein the operation functions by selecting either one of two operation modes defined by the value of one or two or more threshold currents of the whole load region set by the load current value and the output voltage value.

27. The DC/DC converter of claim 7, wherein the operation functions by selecting either one of two operation modes defined by the value of one or two or more threshold currents of the whole load region set by the load current value and the output voltage value.

* * * * *